US007315311B2

(12) United States Patent
Sakai

(10) Patent No.: US 7,315,311 B2
(45) Date of Patent: Jan. 1, 2008

(54) RADIOGRAPHIC IMAGE PROCESSING APPARATUS, RADIOGRAPHIC IMAGE PROCESSING METHOD, COMPUTER PROGRAM FOR ACHIEVING RADIOGRAPHIC IMAGE PROCESSING METHOD, AND COMPUTER-READABLE RECORDING MEDIUM FOR RECORDING COMPUTER PROGRAM

(75) Inventor: Keiichi Sakai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/915,548

(22) Filed: Aug. 11, 2004

(65) Prior Publication Data

US 2005/0041041 A1 Feb. 24, 2005

(30) Foreign Application Priority Data

Aug. 22, 2003 (JP) ............................. 2003-299150

(51) Int. Cl.
*G09G 5/00* (2006.01)
(52) U.S. Cl. ...................................... 345/629; 382/132
(58) Field of Classification Search ................ 345/629, 345/631
See application file for complete search history.

(56) References Cited

U.S. PATENT DOCUMENTS

| 5,414,260 | A | | 5/1995 | Takimoto | ..................... 250/306 |
| 5,535,018 | A | | 7/1996 | Yamano | ..................... 358/444 |
| 5,706,416 | A | * | 1/1998 | Mann et al. | ................. 345/427 |
| 6,563,943 | B1 | * | 5/2003 | Sasada | ........................ 382/132 |
| 6,714,680 | B1 | * | 3/2004 | Sasada | ........................ 382/216 |
| 2001/0007593 | A1 | * | 7/2001 | Oosawa | ...................... 382/132 |
| 2002/0109113 | A1 | * | 8/2002 | Wang et al. | ................ 250/584 |
| 2003/0026469 | A1 | * | 2/2003 | Kreang-Arekul et al. | ... 382/132 |

FOREIGN PATENT DOCUMENTS

| JP | 2002-44413 | 2/2002 |
| JP | 2002-94772 | 3/2002 |

OTHER PUBLICATIONS

Visio 2000 Standard Edition User Guide, Visio Corporation, 1999, pp. 16.*

* cited by examiner

*Primary Examiner*—Kee M. Tung
*Assistant Examiner*—Michelle K Lay
(74) *Attorney, Agent, or Firm*—Fitzpatrick, Cella, Harper & Scinto

(57) ABSTRACT

A radiographic image processing apparatus comprises: an input means for inputting a corresponding point and a corresponding direction with respect to each of plural radiographic images respectively having mutually overlapping areas; a parallel shift means for parallel shifting at least any one of the plural radiographic images so that the corresponding points of these images coincide with others; a rotational shift means for rotationally shifting at least any one of the plural radiographic images so that the corresponding directions of these images coincide with others; and an image synthesis means for synthesizing the plural radiographic images by using the radiographic image shifted by the parallel shift means and the rotational shift means. Thus, it is possible to easily and surely connect plural radiographic images with others by appropriately performing parallel and rotational shifts of these images.

5 Claims, 13 Drawing Sheets

RADIOGRAPHIC IMAGE PROCESSING APPARATUS, RADIOGRAPHIC IMAGE PROCESSING METHOD, COMPUTER PROGRAM FOR ACHIEVING RADIOGRAPHIC IMAGE PROCESSING METHOD, AND COMPUTER-READABLE RECORDING MEDIUM FOR RECORDING COMPUTER PROGRAM

BACKGROUND OF THE INVENTION

1. Field of the Invention

The present invention relates to a radiographic image processing apparatus, a radiographic image processing method, a computer program for achieving that radiographic image processing method, and a computer-readable recording medium for recording that computer program. More particularly, the present invention is suitable to be used in a process of connecting plural digital radiographic images obtained by photographing an identical patient.

2. Related Background Art

In the field of radiotherapy, there is a possibility that a large area incapable of being photographed and held within one film is diagnosed such as scoliosis or the like. In that case, a so-called stitching process of physically connecting plural images respectively photographed and held on plural films is performed, the physically connected images are restored as a global image, and then actual diagnosis is performed based on the obtained global image.

Incidentally, in recent years, digital X-ray image photographing apparatuses such as a CR (computer radiography) apparatus, a DR (digital radiography) apparatus and the like for obtaining digital radiographic images have come into wide use. In such circumstances, there are many requests for performing the stitching process to the digital radiographic images obtained by the digital X-ray image photographing apparatuses.

There have been known Japanese Patent Application Laid-Open Nos. 2002-44413 and 2002-94772 as the conventional arts of performing the stitching process of plural digital radiographic images. These conventional arts are directed to the technology which is useful in a case where plural radiographic cassettes are prepared and plural radiographic images obtained by emitting a single X-ray to the films respectively held in these cassettes are connected with others.

More specifically, in Japanese Patent Application Laid-Open No. 2002-94772, a relatively large subject such as a femur or the like is photographed to obtain plural digital radiographic images of the femur, and, in case of connecting the obtained digital radiographic images with others, parallel and rotational image shifts are corrected by appropriately using a histogram and an identification mark of each of these images.

However, in a case where the stitching process is performed to the images of an area such as a backbone area including numerous similar small bones, when a histogram or the like is calculated as mentioned above, there is a fear that a joining portion where the successive radiographic images are connected with each other is erroneously recognized. For this reason, in an action such as diagnosis in which highly accurate image reading is necessary, it is necessary for a doctor to perform the actually stitching process to the plural digital radiographic images by repeating the parallel and rotational shifts of these images.

On one hand, in order to achieve the stitching process to plural digital images not limited to the digital radiographic images, it is likewise necessary to perform parallel shifts and rotational shifts of arbitrary angles respectively to these images. In that case, although it is possible to display the parallel shift in real time because its calculation amount is small, it is difficult to display the rotational shift in real time because its calculation amount is large.

In case of performing the rotational process of an image by an arbitrary angle, for example, by using PowerPoint™ of Microsoft, a bitmap image, a JPEG (Joint Photographic Experts Group) image and the like cannot be rotated, but only a figure can be rotated. In any case, in case of rotating the figure by PowerPoint™, there are two methods of adding a rotational angle, that is, one for directly inputting the rotational angle by using numerical values, and the other for displaying only the contour line of the figure on a UI (user interface) to cause a user to add the rotational angle with use of a mouse or the like on the UI.

Besides, by using Photoshop™ of Adobe, a bitmap image or the like can be rotated, but in that case, only the contour line of the digital image is merely displayed.

SUMMARY OF THE INVENTION

The present invention has been made in consideration of such conventional problems as above, and an object thereof is to provide an image processing apparatus or an image processing method, which can easily and surely connect plural radiographic images with others by appropriately performing parallel and rotational shifts of these images.

In order to achieve the above object, one aspect of the present invention adopts:

a corresponding point input unit for inputting a pair of corresponding points with respect to each of plural radiographic images respectively having mutually overlapping areas;

a parallel shift unit for parallel shifting at least any one of the plural radiographic images so that one of the corresponding points included in the pair of the corresponding points of the radiographic image coincides with one of the corresponding points included in the pair of the corresponding points of the successive radiographic image;

a rotational shift unit for rotationally shifting at least any one of the plural radiographic images so that the other of the corresponding points included in the pair of the corresponding points of the radiographic image coincides with the other of the corresponding points included in the pair of the corresponding points of the successive radiographic image; and an image synthesis unit for synthesizing the plural radiographic images by using the radiographic image shifted by the parallel shift unit and the rotational shift unit.

Moreover, another aspect of the present invention adopts:

a corresponding point input unit for inputting a pair of corresponding points with respect to each of plural radiographic images respectively having mutually overlapping areas;

a parallel shift unit for parallel shifting at least any one of the plural radiographic images so that one of the corresponding points included in the pair of the corresponding points of the radiographic image coincides with one of the corresponding points included in the pair of the corresponding points of the successive radiographic image;

a rotational shift unit for rotationally shifting at least any one of the plural radiographic images so that the other of the corresponding points included in the pair of the corresponding points of the radiographic image and the other of the corresponding points included in the pair of the corresponding points of the successive radiographic image are in alignment with each other; and an image synthesis unit for synthesizing the plural radiographic images by using the radiographic image shifted by the parallel shift unit and the rotational shift unit.

Other objects and features of the present invention will become apparent from the following description in conjunction with the accompanying drawings.

DESCRIPTION OF THE PREFERRED EMBODIMENTS

First Embodiment

Hereinafter, the first embodiment of the present invention will be explained with reference to the accompanying drawings.

Figure 1:
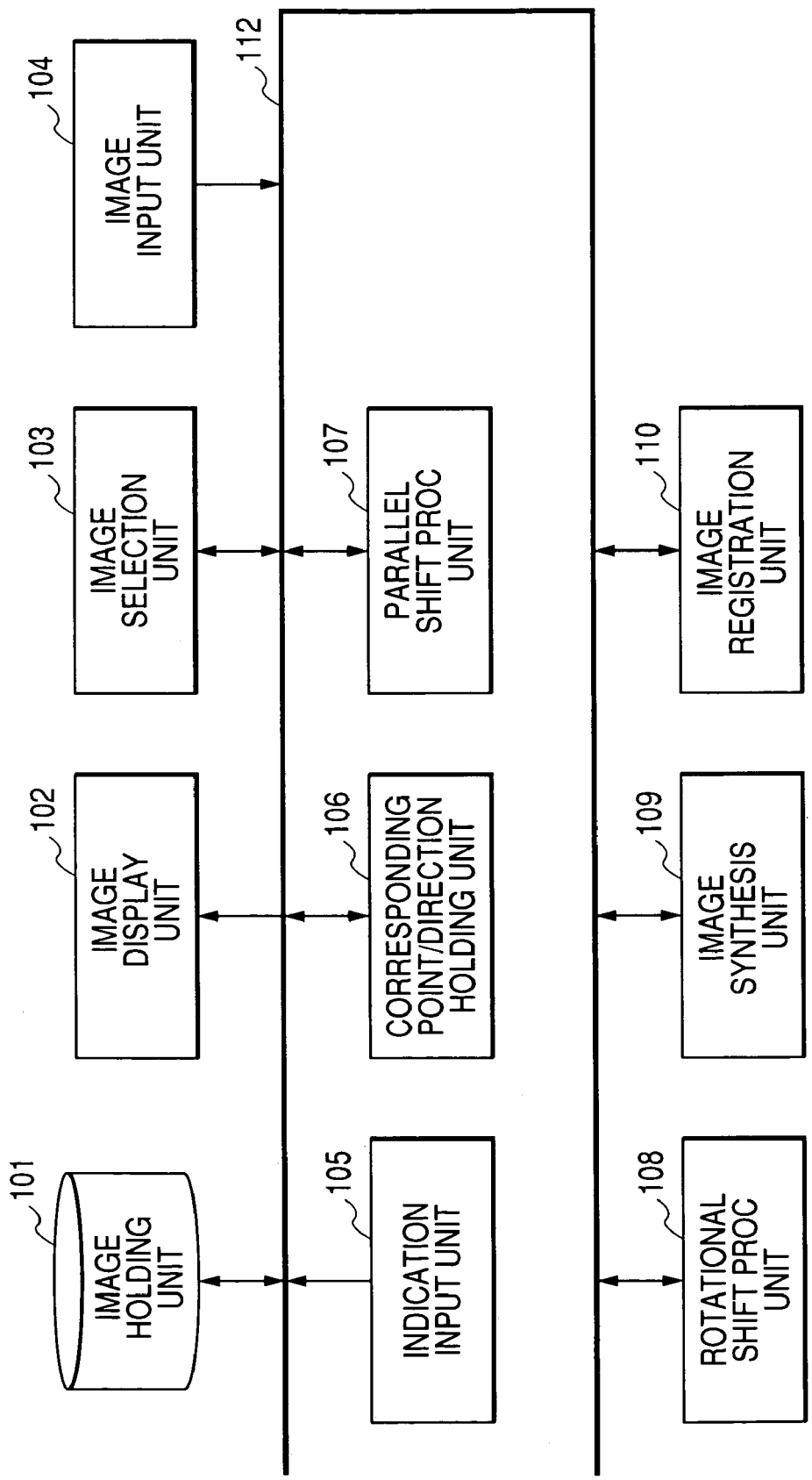
FIG. 1 is a block diagram showing one example of the functional structure of a radiographic image processing apparatus according to the first embodiment of the present invention.

FIG. 1 is a block diagram showing one example of the functional structure of a radiographic image processing apparatus according to the first embodiment.

In FIG. 1, numeral 101 denotes an image holding unit which holds and stores, in a recording device such as a hard disk or the like, numerous digital radiographic images photographed by a digital X-ray image photographing apparatus. In the following explanation, a digital radiographic image will be simply called a radiographic image.

Numeral 102 denotes an image display unit which causes a display unit such as a CRT, a liquid crystal monitor or the like to display as one image the plural radiographic images at a designated magnification.

Numeral 103 denotes an image selection unit which enables a user to select, from among the numerous radiographic images held in the image holding unit 101, the plural radiographic images which have been photographed in an identical medical examination for a specific patient and are two-dimensionally successive.

Incidentally, a method of selecting the plural radiographic images in the image selection unit 103 is not specifically limited. For example, it is possible for the user to select these images by using a dedicated interface independently provided or an existing interface of displaying a list of the radiographic images held in the image holding unit 101. Besides, it is also possible for the user to select these images by using a diagnostic viewer of displaying the respective radiographic images through a multiwindow system.

Numeral 104 denotes an image input unit which captures (or downloads) the plural radiographic images selected by the image selection unit 103 into the image display unit 102.

Numeral 105 denotes an indication input unit such as a mouse, a keyboard and the like which is used to indicate and input user's operation contents with respect to the radiographic images displayed on the image display unit 102.

Numeral 106 denotes a corresponding point/direction holding unit which holds and stores corresponding points and corresponding directions indicated with respect to the radiographic images displayed on the image display unit 102 through the indication input unit 105. Here, it should be noted that the corresponding point is the point on the radiographic image which overlaps the corresponding point on the successive radiographic image, and the corresponding direction is the direction along which the successive radiographic images are connected with each other. In the present embodiment, the corresponding direction begins from the corresponding point. In the following explanation, a corresponding direction will be simply called a direction.

Numeral 107 denotes a parallel shift processing unit which performs parallel shifts of the radiographic images so that the corresponding points of the successive radiographic images held in the corresponding point/direction holding unit 106 coincide with each other.

Numeral 108 denotes a rotational shift processing unit which performs rotational shifts of the radiographic images so that the directions of the successive radiographic images held based on the corresponding points in the corresponding point/direction holding unit 106 coincide with each other.

Numeral 109 denotes an image synthesis unit which synthesizes as one radiographic image the plural radiographic images respectively shifted by the parallel shift processing unit 107 and the rotational shift processing unit 108.

Numeral 110 denotes an image registration unit which registers, to the image holding unit 101, the radiographic image synthesized by the image synthesis unit 109, and numeral 112 denotes a system bus through which the respective units 101 to 110 are mutually connected with others.

Subsequently, the operation of the radiographic image processing apparatus according to the present embodiment will be explained concretely with reference to a flow chart shown in FIG. 2.

Figure 2:
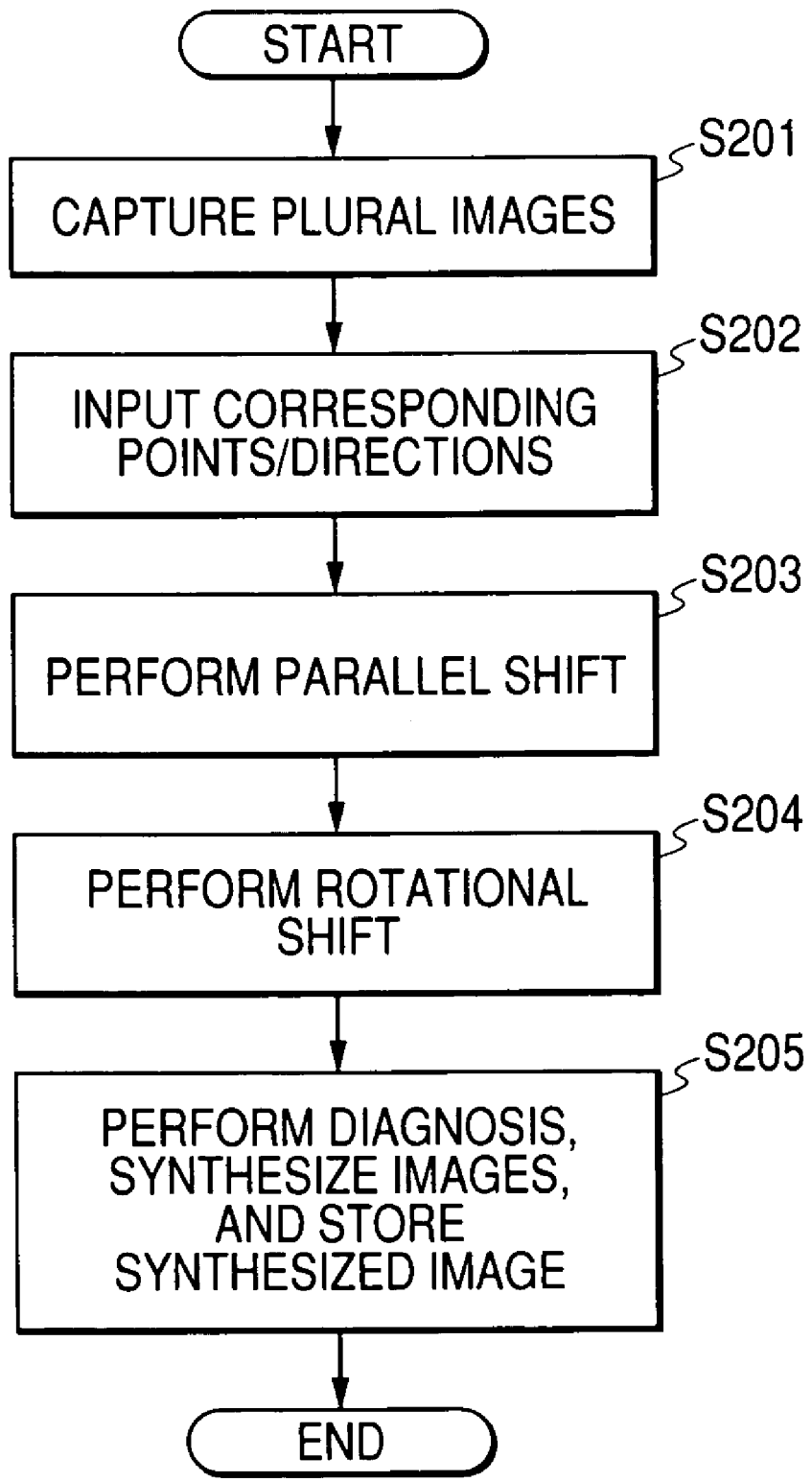
FIG. 2 is a flow chart for explaining the operation of the radiographic image processing apparatus according to the first embodiment of the present invention.

In a step S201 of FIG. 2, the plural radiographic images which have been selected by the image selection unit 103 from among the numerous radiographic images held in the image holding unit 101 are captured and sent by the image input unit 104 to the image display unit 102, and the flow advances to a step S202.

Figure 3:
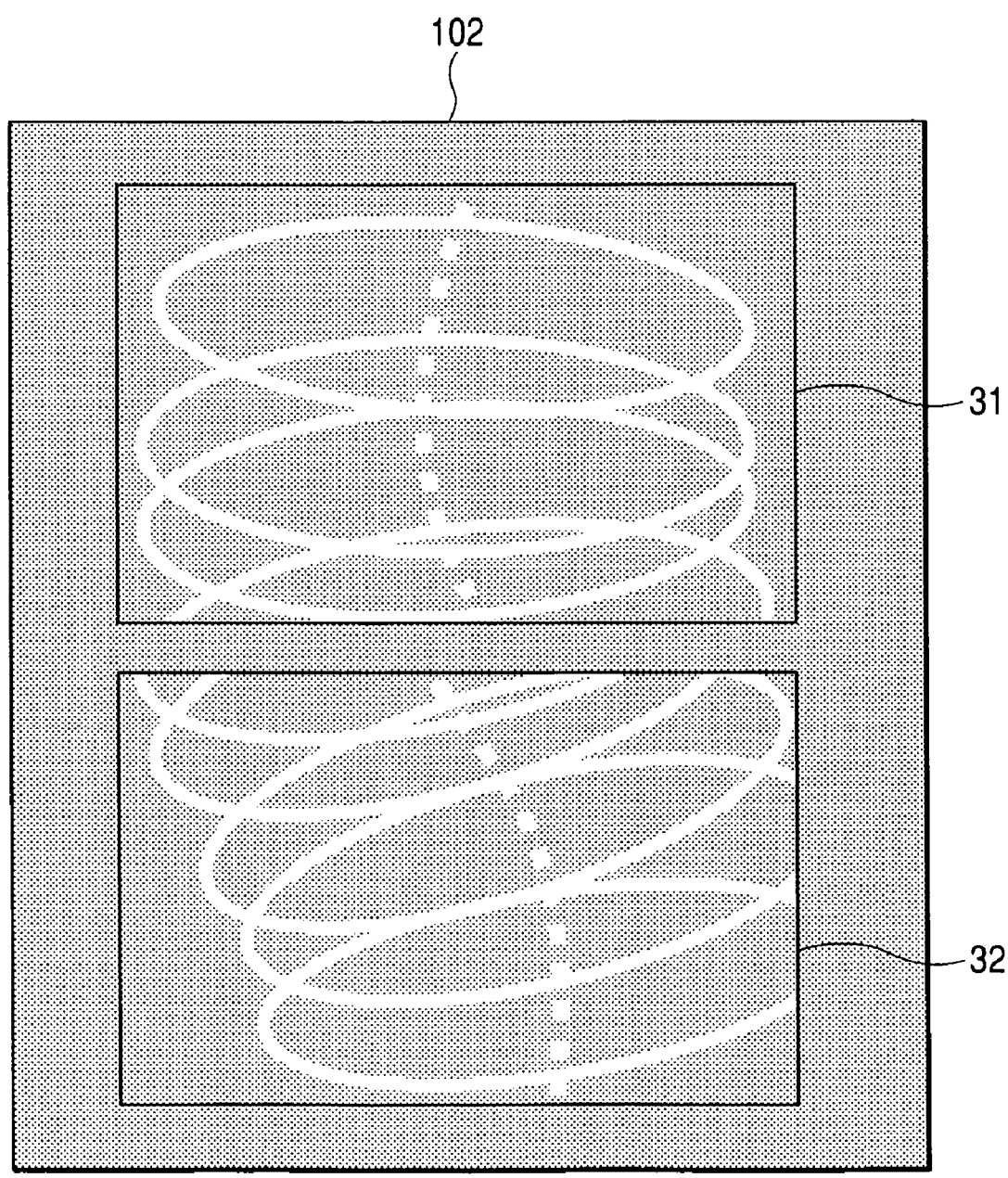
FIG. 3 is a diagram showing a radiographic image of the upper part of a chest and a radiographic image of the lower part of the chest both captured and sent to an image display unit, according to the first embodiment of the present invention.

Here, FIG. 3 shows a radiographic image 31 of the upper part of a chest and a radiographic image 32 of the lower part of the chest both captured and sent to the image display unit 102.

In the step S202, the corresponding points and directions are input through the indication input unit 105 with respect to the two radiographic images 31 and 32 both displayed on the image display unit 102.

Figure 4:
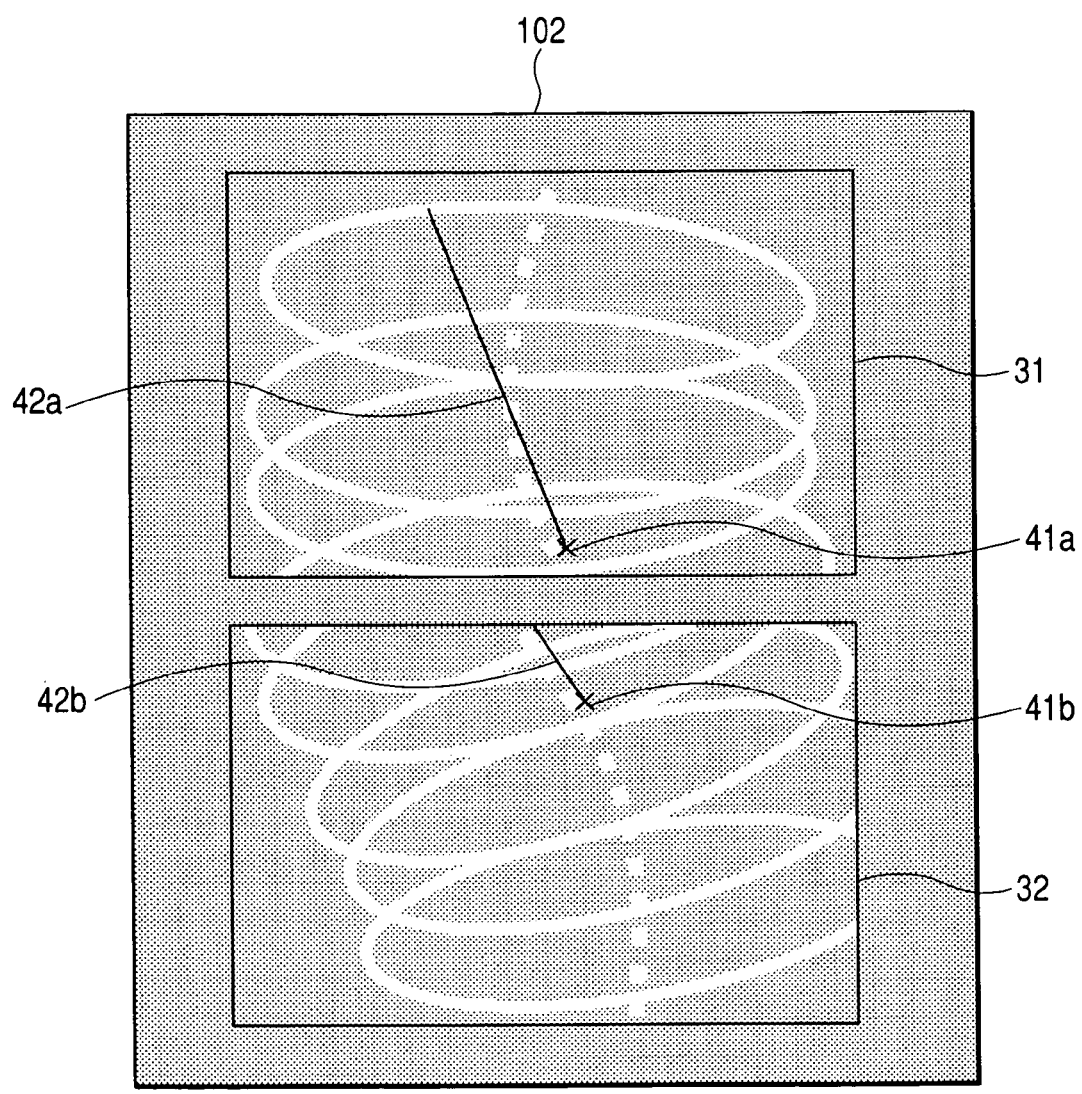
FIG. 4 is a diagram showing an example of corresponding points and directions respectively input by an indication input unit with respect to the radiographic images of the upper and lower parts of the chest, according to the first embodiment of the present invention.

Here, FIG. 4 shows an example of the corresponding points and directions respectively input through the indication input unit 105 with respect to the radiographic images 31 and 32 of the upper and lower parts of the chest. In FIG. 4, the lower left of the backbone area existing on both the radiographic image 31 of the upper part of the chest and the radiographic image 32 of the lower part of the chest is input as corresponding points 41a and 41b with respect to the radiographic images 31 and 32 respectively. Then, the directions along which the backbone extends upward respectively from the corresponding points 41a and 41b are input. Incidentally, in FIG. 4, the directions extending upward from the respective corresponding points 41a and 41b are represented as lines 42a and 42b respectively.

In a step S203, the parallel shifts are performed with respect to both the radiographic images 31 and 32 so that the coordinates of the input corresponding point 41a coincide with the coordinates of the input corresponding point 41b. Then, in a subsequent step S204, the rotational shifts are performed with respect to both the radiographic images 31 and 32 so that the input direction of the radiographic image 31 coincides with the input direction of the radiographic image 32, and the flow subsequently advances to a step S205.

Figure 5:
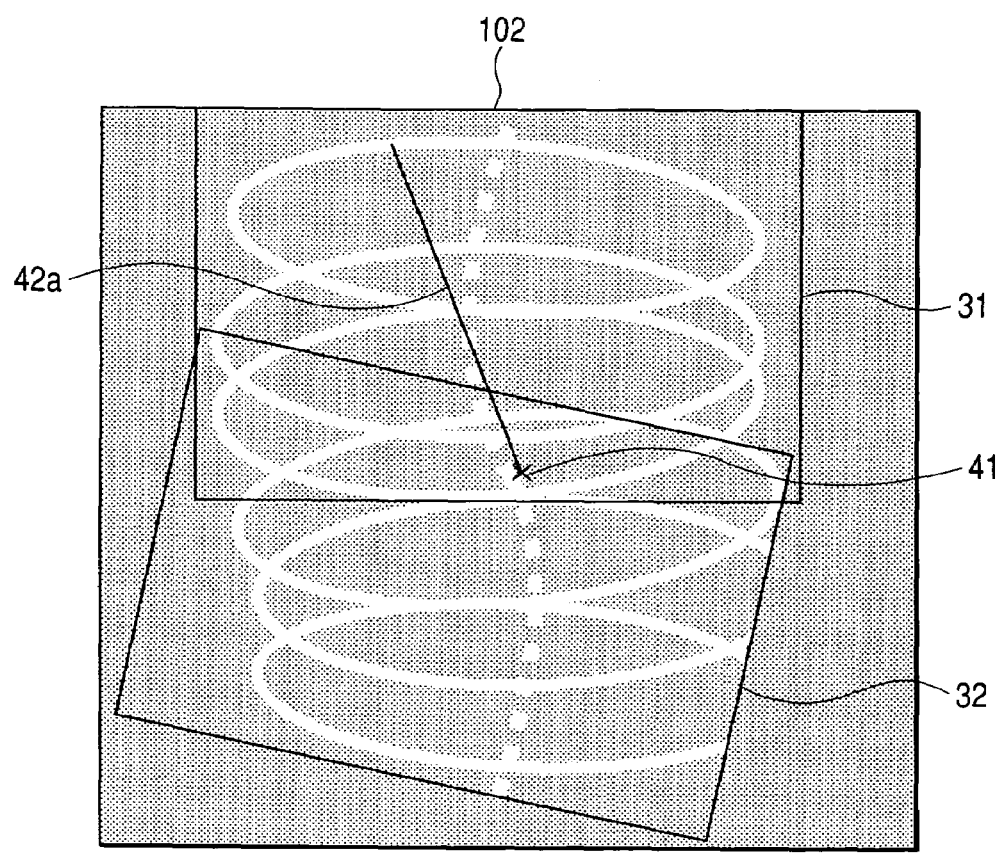
FIG. 5 is a diagram showing a result that the radiographic image of the upper part of the chest is connected with the radiographic image of the lower part of the chest, according to the first embodiment of the present invention.

Here, FIG. 5 shows a result which is obtained by performing the parallel shifts of the radiographic images 31 and 32 in the step S203, performing the rotational shifts of the radiographic images 31 and 32 in the step S204, and then connecting the radiographic images 31 and 32 with each other. Here, numerals 41 and 42 respectively denote corresponding point and direction which are obtained after the radiographic images 31 and 32 were connected with each other.

In the step S205, a doctor executes diagnosis on the basis of the above-connected radiographic images 31 and 32, and synthesizes these images as one image by using the image synthesis unit 109. After then, the synthesized radiographic image is registered by the image registration unit 110 in the image holding unit 101, and the process ends.

As above, in the present embodiment, the corresponding point 41a and the direction are indicated and input with respect to the radiographic image 31, the corresponding point 41b and the direction are indicated and input with respect to the radiographic image 32, and then the parallel and rotational shifts of the radiographic images 31 and 32 are performed so as to coincide the corresponding points and directions of these images with each other. Thus, it is possible to easily achieve the stitching process of the two successive radiographic images.

That is, the corresponding-point 41a and the corresponding direction (line 42a) of the radiographic image 31 are input by the user, the corresponding point 41b and the corresponding direction (line 42b) of the radiographic image 32 two-dimensionally succeeding the radiographic image 31 are input by the user. Then, at least either one of the radiographic images 31 and 32 is subjected to the parallel shift so that the input corresponding points 41a and 41b of these images 31 and 32 coincide with each other, at least either one of the radiographic images 31 and 32 is subjected to the rotational shift so that the input corresponding directions (lines 42a and 42b) coincide with each other, and thus the radiographic image 31 is connected with the radiographic image 32. Therefore, it is possible to easily and surely connect the two radiographic images 31 and 32 with each other.

Incidentally, the two radiographic images 31 and 32 are connected with each other in the present embodiment for the sake of convenience in explanation. However, three or more radiographic images can be also connected with others by the same operations as those described above.

Modification of First Embodiment

Subsequently, the modification of the first embodiment will be explained.

Figure 10:
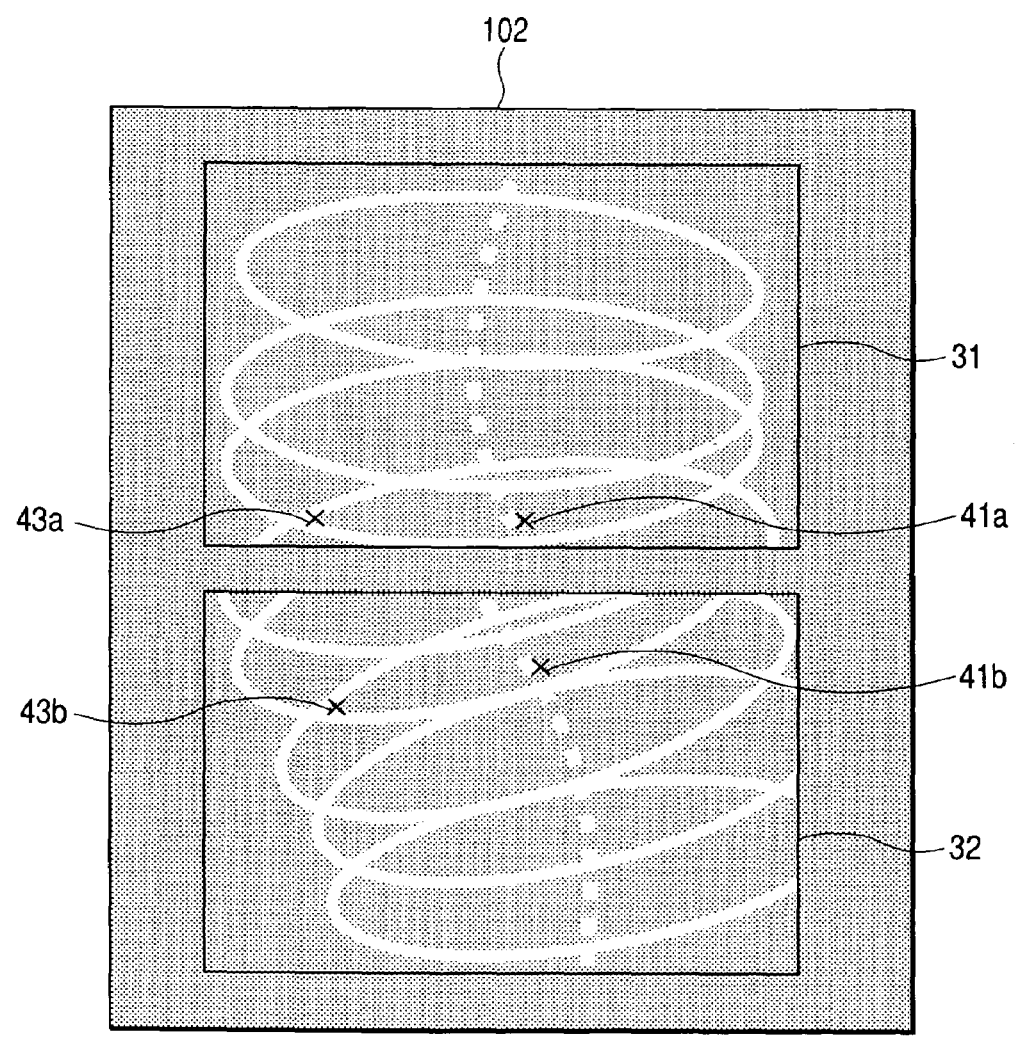
FIG. 10 is a diagram showing an example of two corresponding points input with respect to each of the radiographic images of the upper and lower parts of the chest, according to a modification of the first embodiment of the present invention.

In the above first embodiment, the corresponding point 41a and the direction are indicated and input with respect to the radiographic image 31 and the corresponding point 41b and the direction are indicated and input with respect to the radiographic image 32. However, in this modification of the first embodiment, as shown in FIG. 10, two corresponding points 41a and 43a are indicated and input with respect to the radiographic image 31 and two corresponding points 41b and 43b are indicated and input with respect to the radiographic image 32. In that case, it is possible as a method of associating the corresponding points with each other to use any one of a method of associating the corresponding points 41a, 41b, 43a and 43b with others in the order of inputting, a method of associating the corresponding points 41a and 41b with each other and the corresponding points 43a and 43b with each other by appropriately designating shapes and colors of the marks representing the corresponding points, and a method of associating the corresponding points 41a, 41b, 43a and 43b with others in the order of inputting and displaying the corresponding points 41a and 41b and the corresponding points 43a and 43b as appropriately changing shapes and colors of the marks representing the corresponding points.

Figure 11:
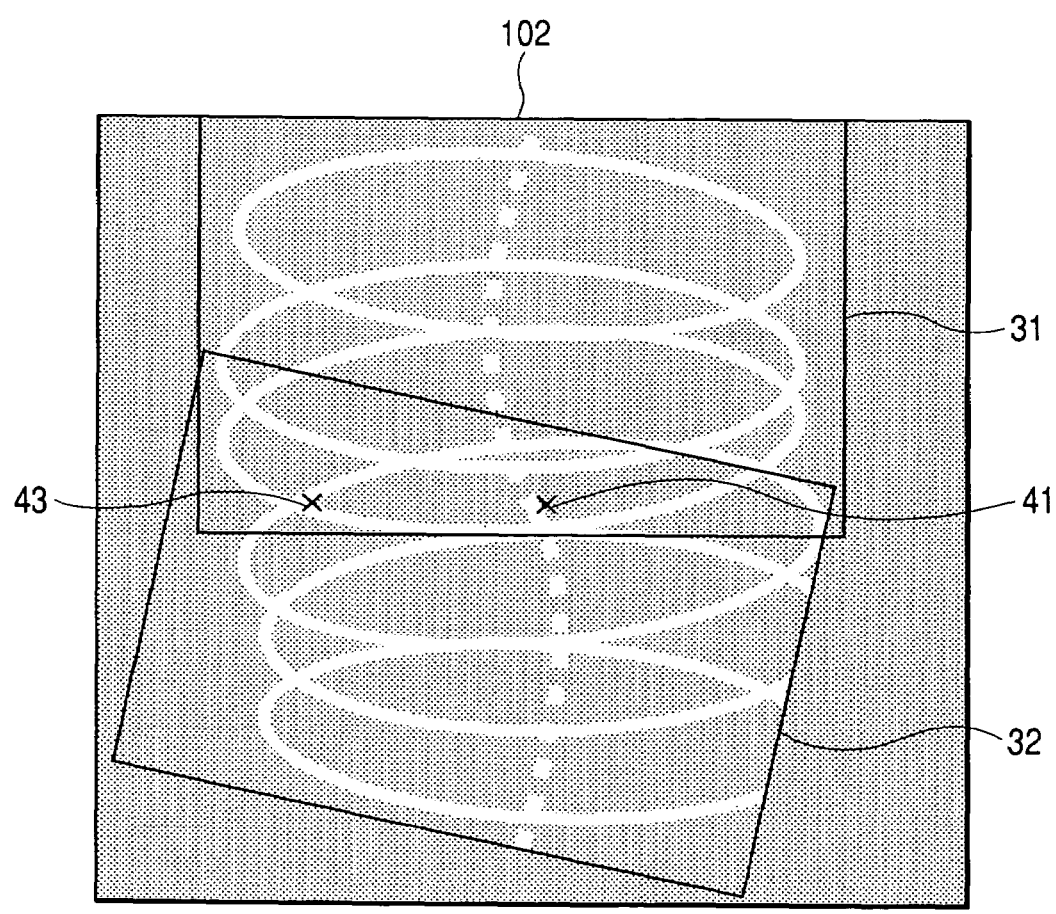
FIG. 11 is a diagram showing a result that the radiographic image of the upper part of the chest is connected with the radiographic image of the lower part of the chest, according to the modification of the first embodiment of the present invention.

More specifically, as shown in FIG. 11, either one of the two radiographic images 31 and 32 is parallel shifted to coincide the corresponding points 41a and 41b with each other (corresponding point 41), and then either one of the two radiographic images 31 and 32 is rotationally shifted to coincide the corresponding points 43a and 43b with each other (corresponding point 43).

In case of connecting the two radiographic images 31 and 32 with each other, if the distance between the corresponding point 41a and the corresponding point 43a is different from the distance between the corresponding point 41b and the corresponding point 43b, it is impossible to coincide the corresponding points 41a and 41b with each other and also coincide the corresponding points 43a and 43b with each other completely. In that case, the rotational shift is performed so that only the corresponding points 41a and 41b coincide with each other and the corresponding points 43a and 43b are in alignment with each other. By doing so, it is possible to coincide the directions of the two radiographic images 31 and 32 with each other. Besides, it is also possible to coincide the middle point between the corresponding points 41a and 43a with the middle point between the corresponding points 41b and 43b so as to coincide the directions of the two radiographic images with each other.

Figure 12:
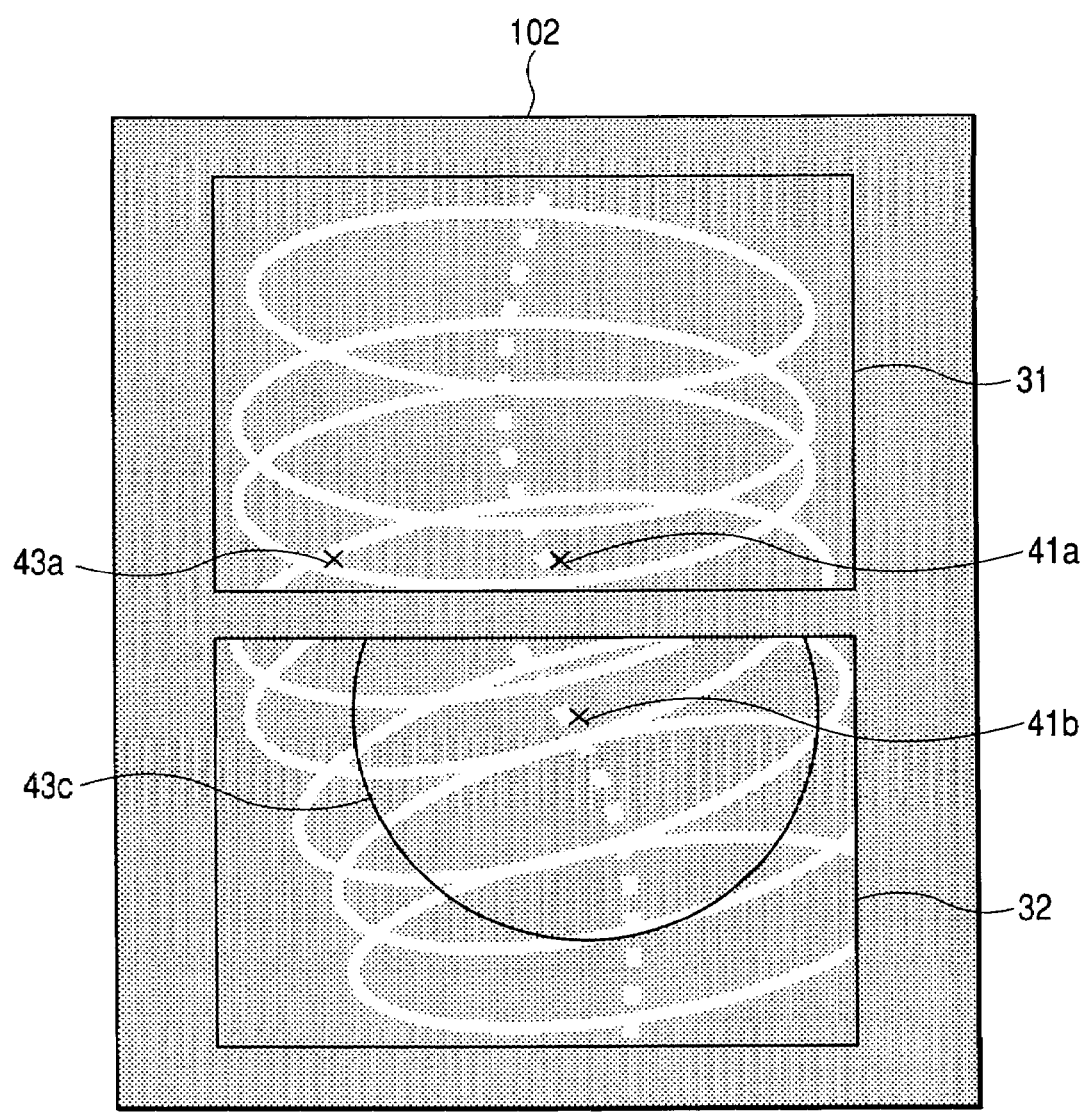
FIG. 12 is a diagram showing an example of an auxiliary line to be displayed for causing a user to easily input a second corresponding point with respect to the radiographic image of the lower part of the chest, according to a modification of the first embodiment of the present invention.

Moreover, as shown in FIG. 12, the two corresponding points are first input with respect to one of the two radiographic images (i.e., the radiographic image 31 in this instance), and then the first corresponding point (i.e., the corresponding point 41b in this instance) is designated with respect to the other of the two radiographic images (i.e., the radiographic image 32 in this instance). After then, an arc 43c of which the radius is the same as the distance between the corresponding points 41a and 43a is displayed, as an auxiliary line, while centering on the corresponding point 41b. By providing and displaying such an auxiliary line, the user can more easily input the second corresponding point. Incidentally, if the input position of the second corresponding point is limited to the position on the arc 43c, it is possible to increase input accuracy of the corresponding point.

Second Embodiment

Subsequently, the second embodiment of the present invention will be explained. Here, in the following, the parts which are the same as those in the first embodiment are respectively denoted by the same reference numerals shown in FIGS. 1 to 5, and the detailed explanation thereof will be omitted.

In the first embodiment, the corresponding points 41a and 41b and the corresponding directions are obtained in the corresponding point/direction input process (step S202). In this instance, in a case where the obtained corresponding points and directions are enlarged and inspected in detail, a user occasionally finds a small misalignment in these points and directions and thus wishes to correct it. Here, in case of correcting the misalignment, when the parallel shift is performed, the real-time process can be performed by the image display unit 102 as described in the related background art. Meanwhile, when the rotational shift is performed, the real-time display cannot be performed by the image display unit 102 because the calculation amount of the rotational shift process is remarkably large.

Figure 6:
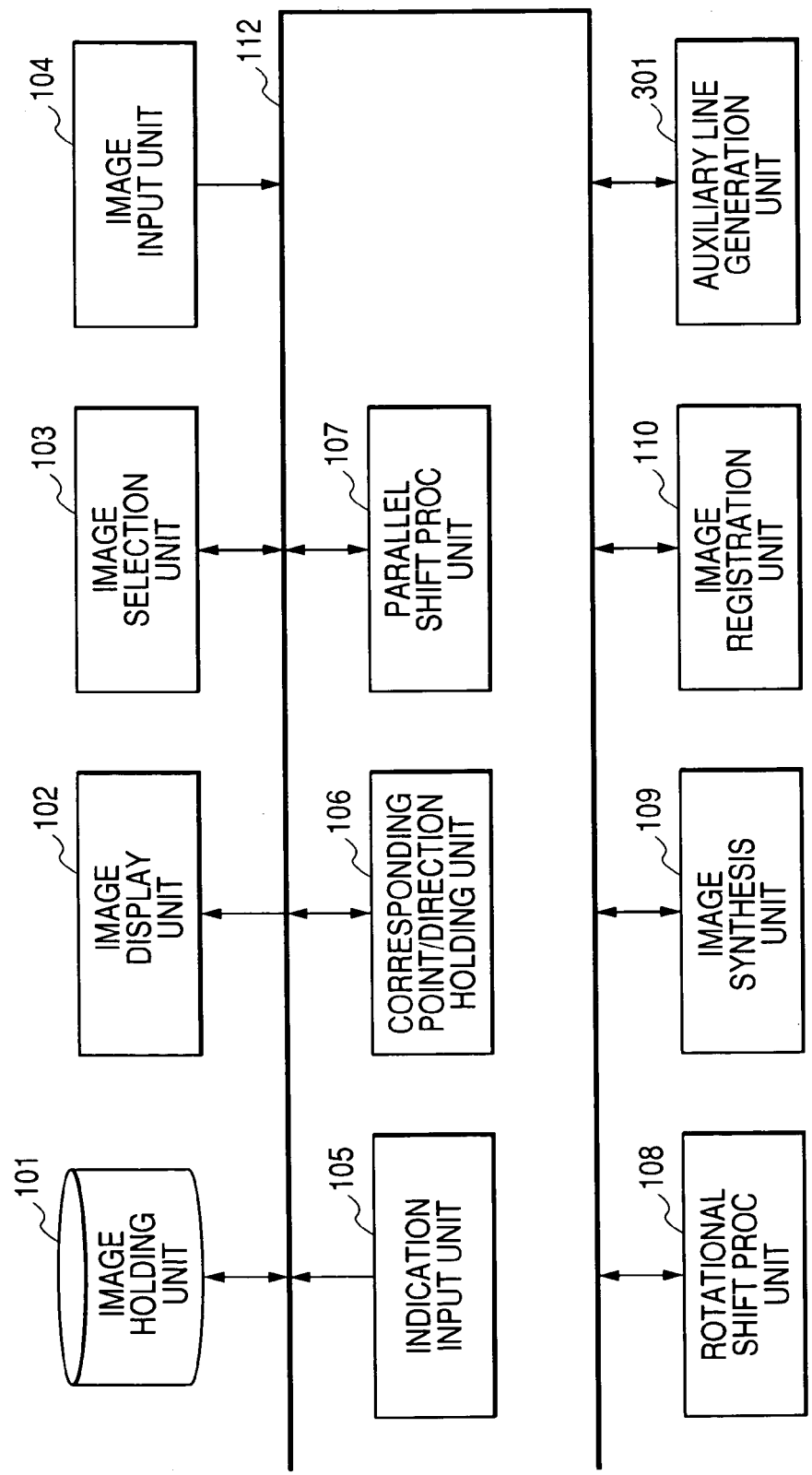
FIG. 6 is a block diagram showing one example of the functional structure of a radiographic image processing apparatus according to the second and third embodiments of the present invention.
Figure 8:
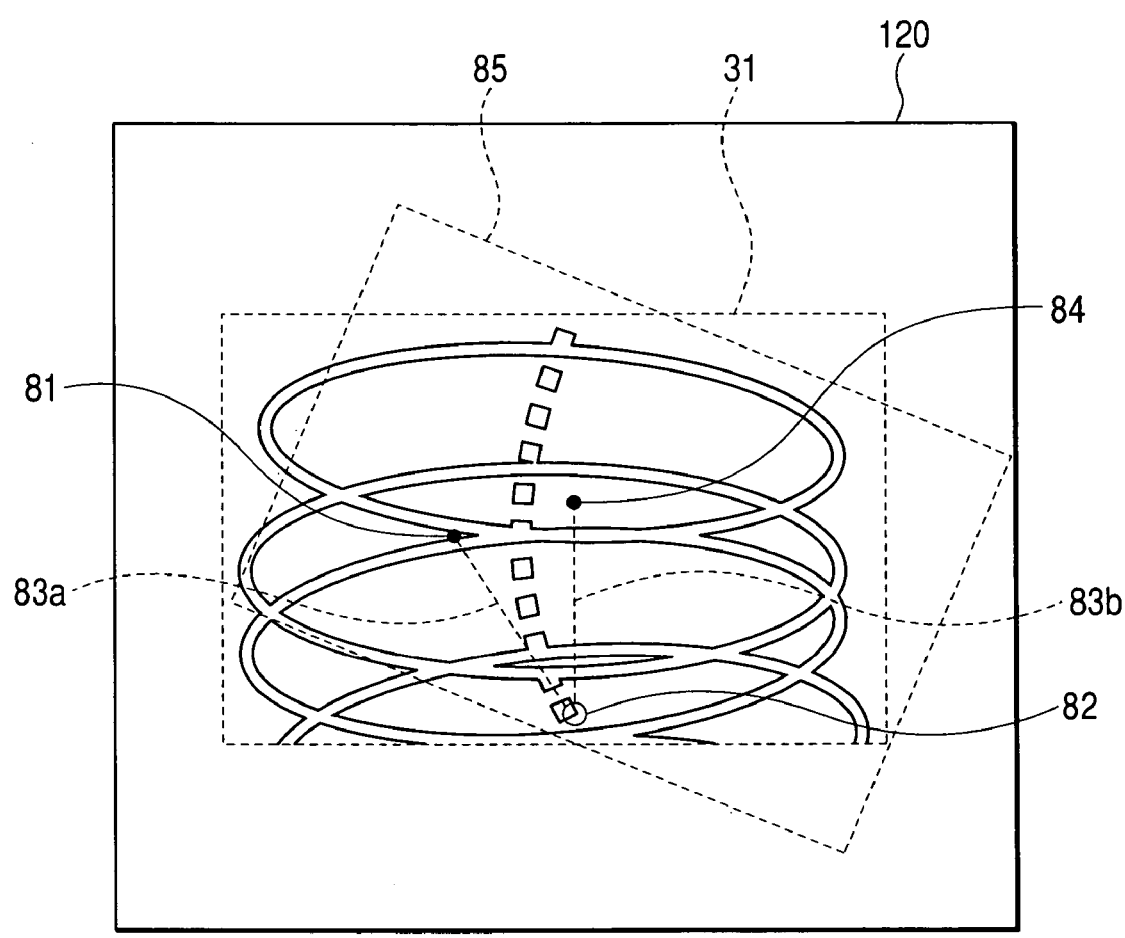
FIG. 8 is a diagram showing an example of auxiliary lines to be displayed when a radiographic image is corrected by rotationally shifting the position thereof, according to the second embodiment of the present invention.

Here, in the enlarged radiographic image, when only the contour lines of the radiographic image are displayed as mentioned in the related background art, there is a fear that the contour line is not displayed within the display screen. Thus, as shown in FIGS. 6 and 8, in the present embodiment, a first auxiliary line 83a of connecting a rotational operation position 81 and a rotation center 82 with each other and a second auxiliary line 83b of connecting a position 84 and the rotation center 82 with each other are displayed together with a contour line 85 on an image display unit 102, so that the user can easily know a rotational angle while the rotational shift is being performed. Here, it should be noted that the rotational operation position 81 is the before-rotation position which is input by an auxiliary line generation unit 301 through an indication input unit 105, the rotation center 82 is held in a corresponding point/direction holding unit 106, and the position 84 is the in-operation position which is input through the indication input unit 105. Incidentally, the above rotational operation is performed by, for example, dragging the before-rotation rotational operation position 81. That is, when a mouse button is released at the position represented by the contour line 85, a radiographic image 31 is rotationally shifted to that position.

Figure 7:
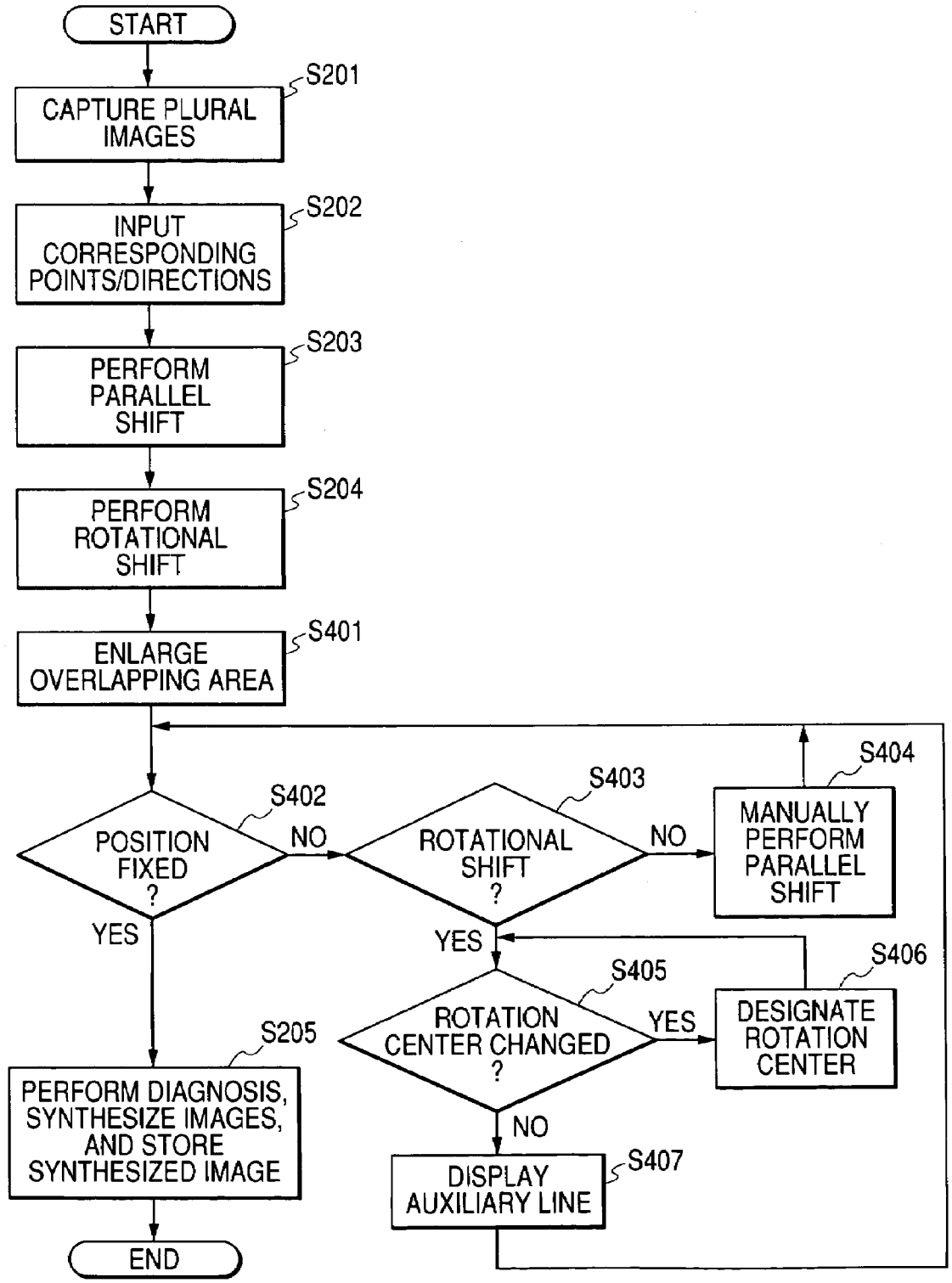
FIG. 7 is a flow chart for explaining the operation of the radiographic image processing apparatus according to the second and third embodiments of the present invention.

FIG. 7 is a flow chart for explaining the operation of the radiographic image processing apparatus according to the present embodiment structured as described above. Here, it should be noted that, as shown in FIG. 7, this flow chart is completed by providing steps S401 to S407 between the steps S204 and S205 shown in the flow chart of FIG. 2.

More specifically, in the operation in question, the overlapping area of the radiographic images 31 and 32 connected with each other is enlarged and displayed in the step S401. Then, it is judged in the step S402 whether or not to correct the radiographic images 31 and 32 connected with each other, on the basis of the user's operation contents input through the indication input unit 105.

When it is judged in the step S402 to correct the radiographic images 31 and 32 (that is, it is judged that the positions of the radiographic images 31 and 32 are not fixed), the flow advances to the step S403 to judge based on the user's operation contents input through the indication input unit 105 whether or not to perform the rotational shift with respect to the radiographic images 31 and 32. Then, when it is judged not to perform the rotational shift, the flow further advances to the step S404 to manually perform the parallel shift through the indication input unit 105. After then, the flow returns to the step S402.

Meanwhile, when it is judged in the step S403 to perform the rotational shift, the flow advances to the step S405 to judge whether or not to change the rotation center from the corresponding point. When it is judged in the step S405 to change the rotation center from the corresponding point, the flow further advances to the step S406 to designate a new rotation center through the indication input unit 105, and then the flow returns to the step S405. Meanwhile, when it is judged in the step S405 not to change the rotation center, the flow further advances to the step S407 to cause the image display unit 102 to display the above auxiliary line generated by the auxiliary line generation unit 301, and then the flow returns to the step S402.

Moreover, the process to be performed through the steps S402 to S407 is repeated until the positions of the radiographic images 31 and 32 are fixed.

Figure 13:
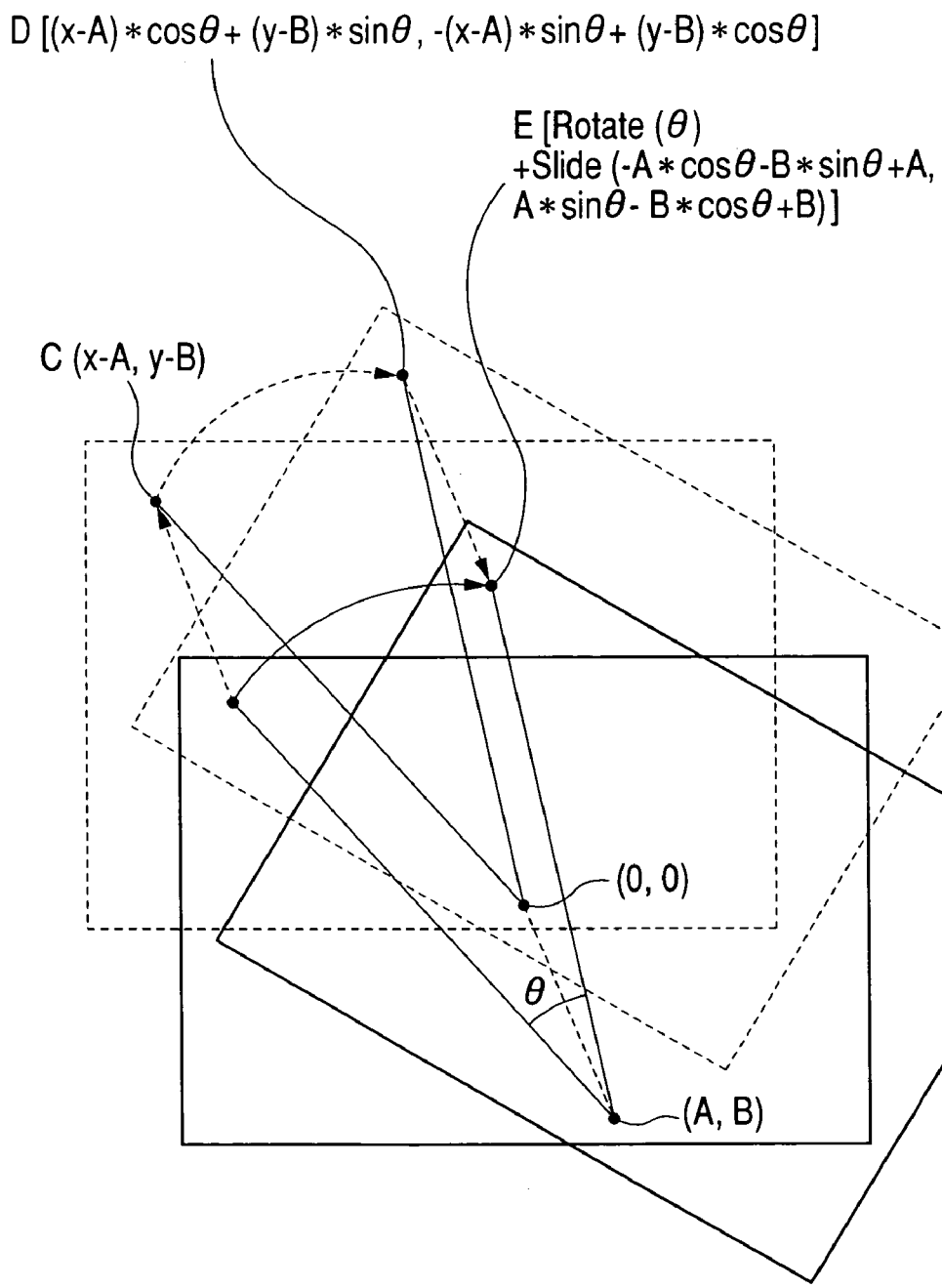
FIG. 13 is a diagram for explaining a rotation amount of the radiographic image according to the second embodiment of the present invention.

Incidentally, as shown in FIG. 13, it should be noted that the rotation of which the rotation center has the coordinates (A, B) and of which the rotational angle is $\theta$ is equivalent to the image which is obtained by performing the parallel shift (slide) of $(-A^*\cos\theta - B^*\sin\theta + A, A^*\sin\theta - B^*\cos\theta + B)$ after performing the rotational shift (slide) of the rotational angle $\theta$ while centering on the original point (e.g., the center (0, 0) of the image). Incidentally, it is assumed that "shift" and "slide" indicate the same operation throughout the specification and the drawings.

Moreover, in FIG. 13, the coordinates of a point C are $(x-A, y-B)$, the coordinates of a point D are $((x-A)^*\cos\theta + (y-B)^*\sin\theta, -(x-A)^*\sin\theta + (y-B)^*\cos\theta)$, and the coordinates of a point E are {Rotate($\theta$)+Slide($-A^*\cos\theta - B^*\sin$ θ+A, A*sin θ−B*cos θ+B)}. More specifically, the coordinates of the point E are obtained by the following equation (1).

$$((x-A)*\cos\theta+(y-B)*\sin\theta+A, x-A)*\sin\theta+(y-B)*\cos\theta+B) = \quad (1)$$
$$(x*\cos\theta+y*\sin\theta-A*\cos\theta-B*\sin+A,$$
$$-x*\sin\theta+y*\cos\theta+A*\sin\theta-B*\cos\theta+B) =$$
$$\text{Rotate}(\theta)+\text{Slide}(-A*\cos\theta-B*\sin\theta+A, A*\sin\theta-B*\cos\theta+B)$$

As described above, according to the present embodiment, the first auxiliary line 83a, the second auxiliary line 83b and the contour line 85 are displayed on the image display unit 105. Therefore, when the user wishes to correct the positions of the radiographic images 31 and 32 mutually connected in the method of the first embodiment by rotationally shifting these images, it is possible to display the rotational angle during the rotational operation so that the user can easily know this angle. Thus, it is impossible to improve operability when the positions of the mutually connected radiographic images 31 and 32 are corrected.

Incidentally, although the radiographic image 31 is rotationally shifted in the present embodiment, it is of course possible to correct the image position by rotationally shifting the radiographic image 32 instead of the radiographic image 31. Moreover, although the distance between the before-rotation rotational operation position 81 and the rotation center 82 is the same as the distance between the in-operation position 84 and the rotation center 83 in FIG. 8, it is possible to arbitrarily set the before-rotation rotational operation position 81 in the radiographic image. Moreover, the distance between the before-rotation rotational operation position 81 and the rotation center 82 may not be the same as the distance between the in-operation position 84 and the rotation center 83.

Third Embodiment

Subsequently, the third embodiment of the present invention will be explained.

Figure 9:
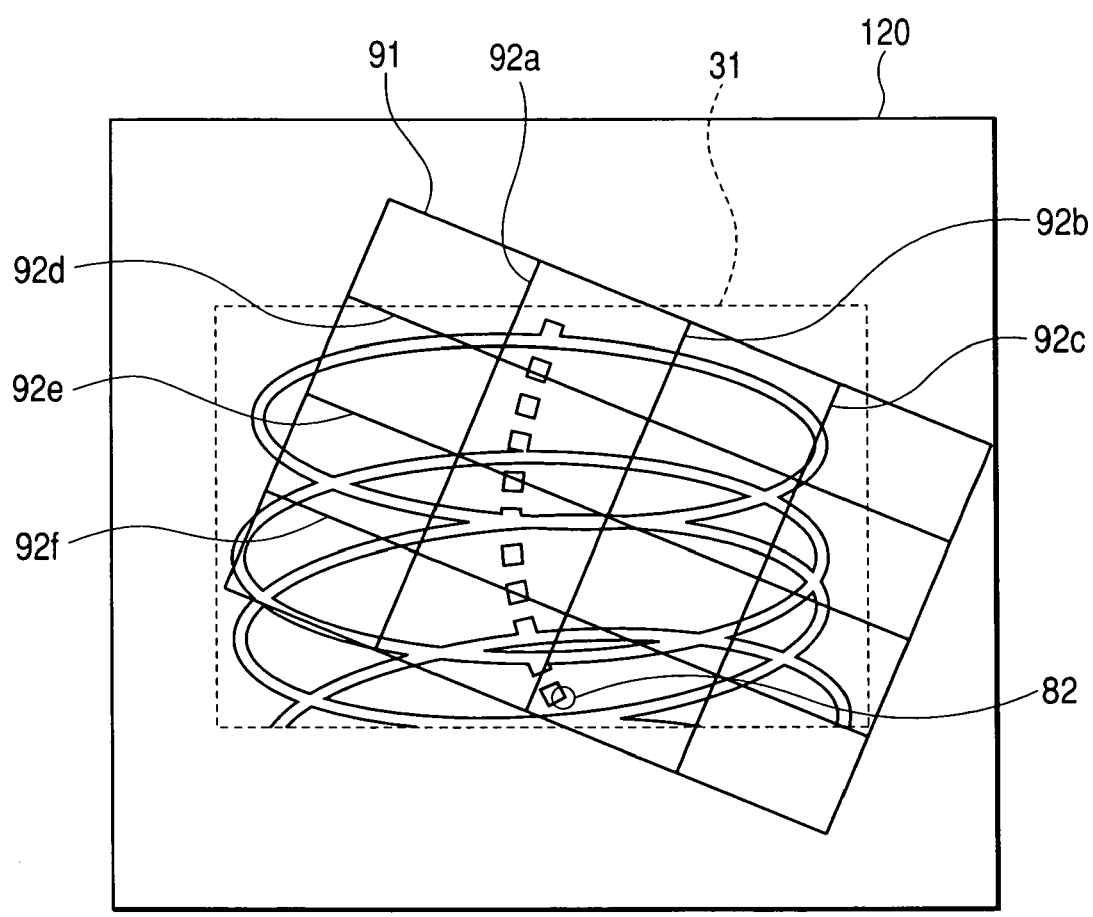
FIG. 9 is a diagram showing an example of auxiliary lines to be displayed when the radiographic image is corrected by rotationally shifting the position thereof, according to the second embodiment of the present invention.

In the above second embodiment, the first auxiliary line 83a, the second auxiliary line 83b and the contour line 85 are generated by the auxiliary line generation unit 301 and then displayed on the image display unit 105 so that the user can easily know the rotational angle during the rotational operation. On one hand, in the present embodiment, as shown in FIG. 9, a contour line 91 and grid lines 92a to 92f being parallel with the contour line 91 are displayed on the image display unit 105 so that a user can easily know a rotational angle during the rotational operation. Even by doing so, it is possible to obtain the same effects as those in the above second embodiment.

Other Embodiments of Present Invention

The present invention includes a case where program codes of software to achieve the functions of the above embodiments are supplied to a computer in an apparatus or a system connected to various devices so as to operate these devices to achieve the functions of the above embodiments, and thus the computer (or CPU, MPU) in the apparatus or the system reads and executes the program codes supplied and stored therein.

In that case, the program codes themselves achieve the functions of the above embodiments. Thus, the program codes themselves and a means, e.g., a storage medium of storing these program codes, for supplying these program codes to the computer constitute the present invention. Here, as the storage medium of storing the program codes, for example, it is possible to use a flexible disk, a hard disk, an optical disk, a magneto optical disk, a CD-ROM, a magnetic tape, a nonvolatile memory card, a ROM, or the like.

Besides, it is needless to say that the present invention includes not only a case where the functions of the above embodiments can be achieved by causing the computer to read and execute the supplied program codes but also a case where the functions of the above embodiments can be achieved by causing an operating system (OS) running on the computer or the OS and other application software to read and execute the program codes.

Moreover, it is needless to say that the present invention includes a case where the supplied program codes are once stored in a memory of a function expansion board inserted in the computer or a function expansion unit connected to the computer and then a CPU provided in the function expansion board or the function expansion unit executes some or all of the actual process on the basis of instructions of these program codes, thereby achieving the functions of the above embodiments.

This application claims priority from Japanese Patent Application No. 2003-299150 filed Aug. 22, 2003, which is hereby incorporated by reference herein.

What is claimed is:

1. A radiographic image processing apparatus comprising:
   a first input unit adapted to input a first pair of points on a first radiographic image;
   a second input unit adapted to input one of a second pair of points on a second radiographic image after input of the first pair of points;
   a display unit adapted to display an arc line on the second radiographic image, based on a distance between the first pair of points on the first radiographic image while centering on one of the second pair of points after input of one of the second pair of points;
   a third input unit adapted to input the other of the second pair of points on the arc line;
   a shift unit adapted to shift one of the first and second radiographic images to coincide the first pair of points and the second pair of points; and
   an image synthesis unit adapted to synthesize the first and second radiographic images by using one of the first and second radiographic images shifted by said shift unit.

2. A radiographic image processing apparatus according to claim 1, wherein said display unit displays a grid contour line of one of the first and second radiographic images which are being shifted.

3. A radiographic image processing method comprising:
   a first input step of inputting a first pair of points on a first radiographic image;
   a second input step of inputting one of a second pair of points on a second radiographic image after input of the first pair of points;
   a display step of displaying an arc line on the second radiographic image, based on a distance between the first pair of points on the first radiographic image while centering on one of the second pair of points after input of one of the second pair of points;
   a third input step of inputting the other of the second pair of points on the arc line;
   a shift step of shifting one of the first and second radiographic images to coincide the first pair of points and the second pair of points; and an image synthesis step of synthesizing the first and second radiographic images by using one of the first and second radiographic images shifted in said shift step.

4. A radiographic image processing method according to claim 3, wherein said display step displays a grid contour line of one of the first and second radiographic images which are being shifted.

5. A computer-readable storage medium storing a computer-executable program, the program for causing a computer to execute an image processing method, including:

a first input process of inputting a first pair of points on a first radiographic image;

a second input process of inputting one of a second pair of points on a second radiographic image after input of the first pair of points;

a display process of displaying an arc line on the second radiographic image, based on a distance between the first pair of points on the first radiographic image while centering on one of the second pair of points after input of one of the second pair of points;

a third input process of inputting the other of the second pair of points on the arc line;

a shift process of shifting one of the first and second radiographic images to coincide the first pair of points and the second pair of points; and an image synthesis process of synthesizing the first and second radiographic images by using one of the first and second radiographic images shifted in said shift process.

* * * * *